United States Patent
Ford

(10) Patent No.: US 7,433,943 B1
(45) Date of Patent: Oct. 7, 2008

(54) VOLUME-BASED NETWORK MANAGEMENT SCHEME

(75) Inventor: Richard Vernon Ford, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 757 days.

(21) Appl. No.: 10/027,101

(22) Filed: Dec. 20, 2001

(51) Int. Cl.
*G06F 15/173* (2006.01)

(52) U.S. Cl. ............... 709/223; 709/224; 709/250; 370/235; 370/352; 370/431

(58) Field of Classification Search ............... 709/223
See application file for complete search history.

(56) References Cited

U.S. PATENT DOCUMENTS

| | | | | |
|---|---|---|---|---|
| 5,634,006 A | * | 5/1997 | Baugher et al. | 709/228 |
| 6,141,686 A | * | 10/2000 | Jackowski et al. | 709/224 |
| 6,240,097 B1 | * | 5/2001 | Wesolek et al. | 370/431 |
| 6,426,943 B1 | * | 7/2002 | Spinney et al. | 370/235 |
| 6,636,898 B1 | * | 10/2003 | Ludovici et al. | 709/250 |
| 6,714,987 B1 | * | 3/2004 | Amin et al. | 709/249 |
| 6,820,117 B1 | * | 11/2004 | Johnson | 709/223 |
| 6,999,449 B2 | * | 2/2006 | Barna et al. | 370/352 |
| 2002/0046277 A1 | * | 4/2002 | Barna et al. | 709/224 |
| 2002/0152319 A1 | * | 10/2002 | Amin et al. | 709/232 |
| 2002/0194140 A1 | * | 12/2002 | Makuck | 705/67 |

OTHER PUBLICATIONS

Yahoo! Geocities Pro Overview (Http://billing.mail.yahoo.com/yo/VOrderingAbout?/), no date.

* cited by examiner

*Primary Examiner*—Yves Dalencourt
(74) *Attorney, Agent, or Firm*—Baker Botts L.L.P.

(57) ABSTRACT

Methods, apparatuses and systems allowing for deployment of volume-based network policies across a computer network. In one embodiment, the present invention monitors network utilization of a plurality of users and detects the occurrence of network utilization milestones or other events for individual users, such as exceeding a data transfer allotment or threshold. To enforce the allotment or threshold, the present invention is operative to deny, degrade, or otherwise affect a characteristic associated with network access provided to such users.

20 Claims, 7 Drawing Sheets

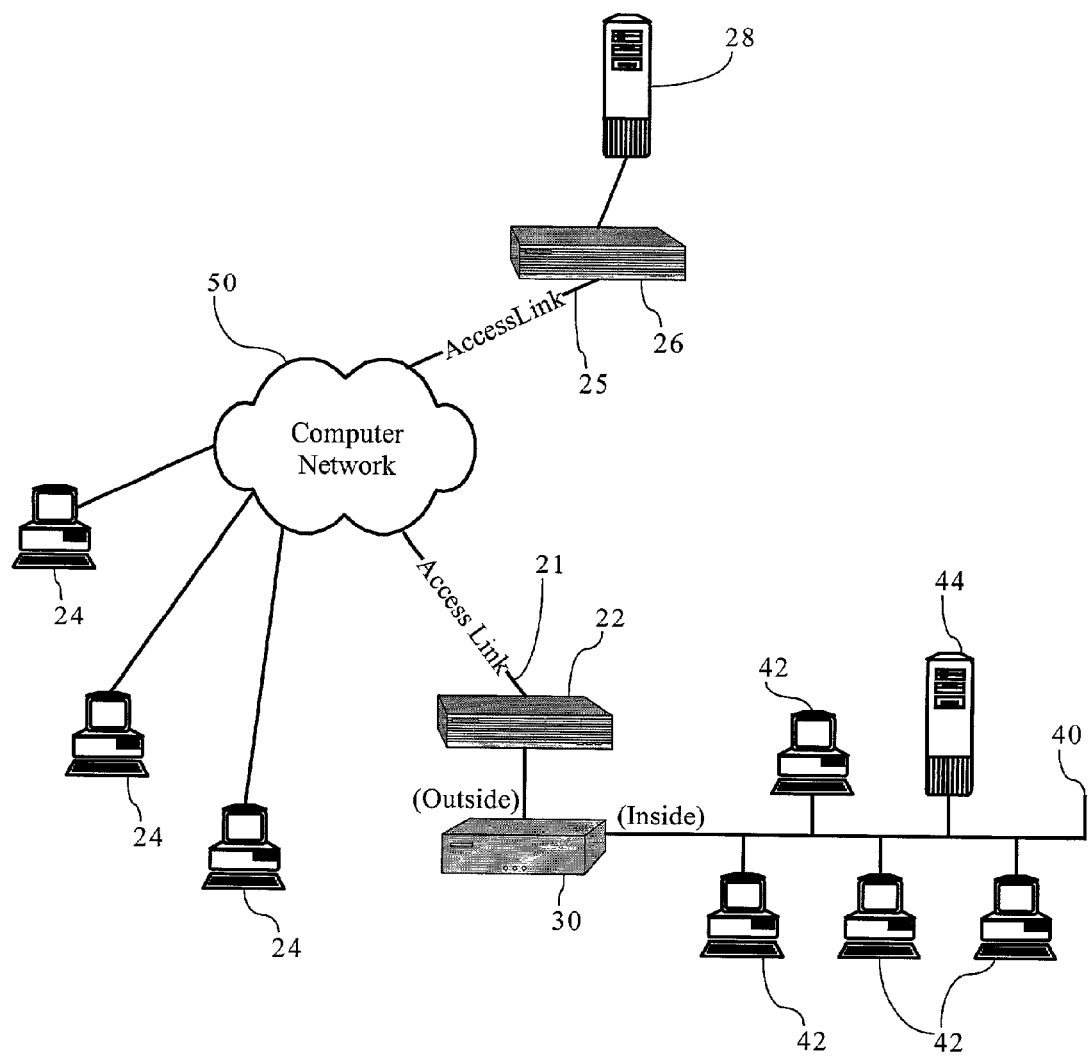
Fig._1

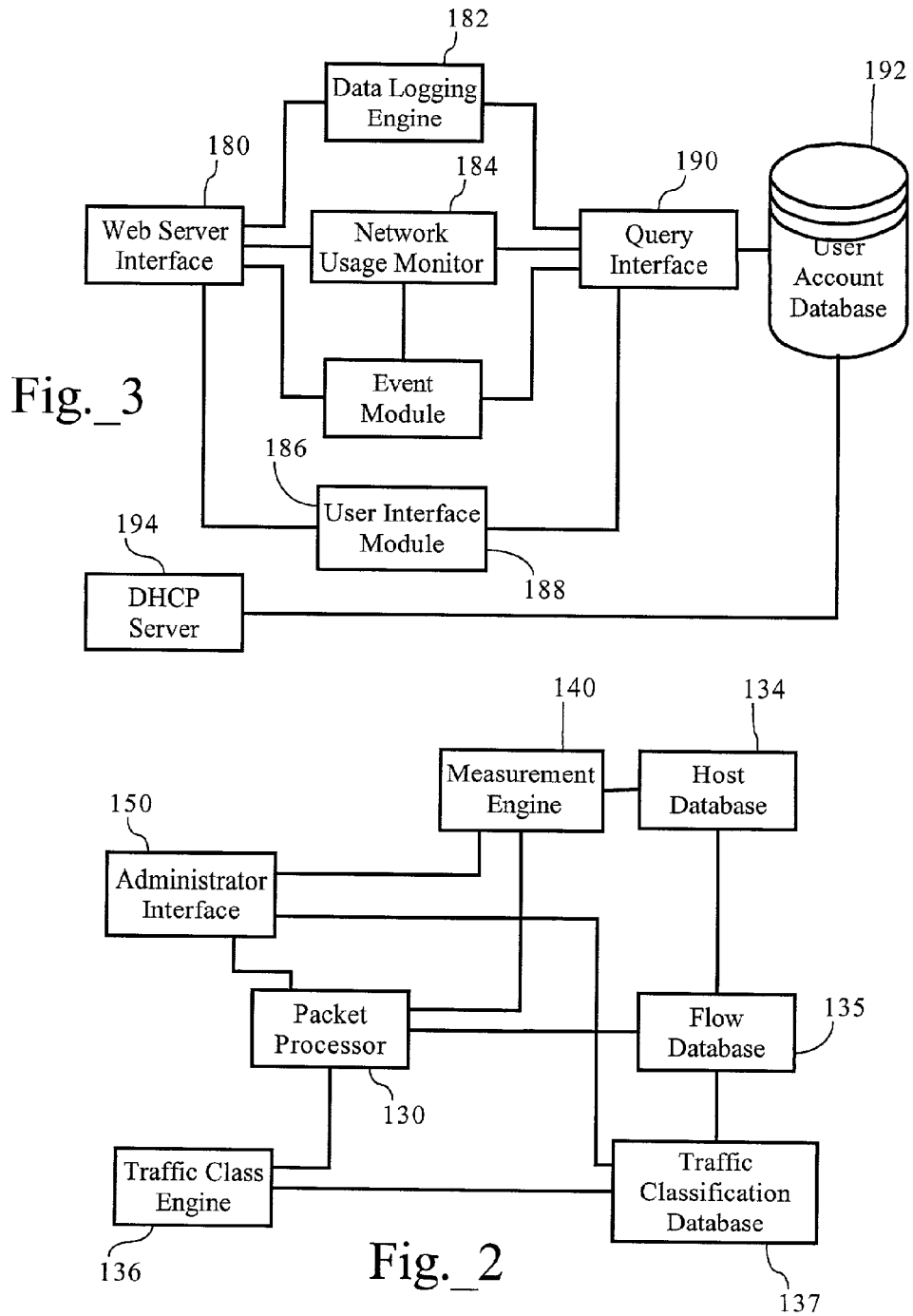

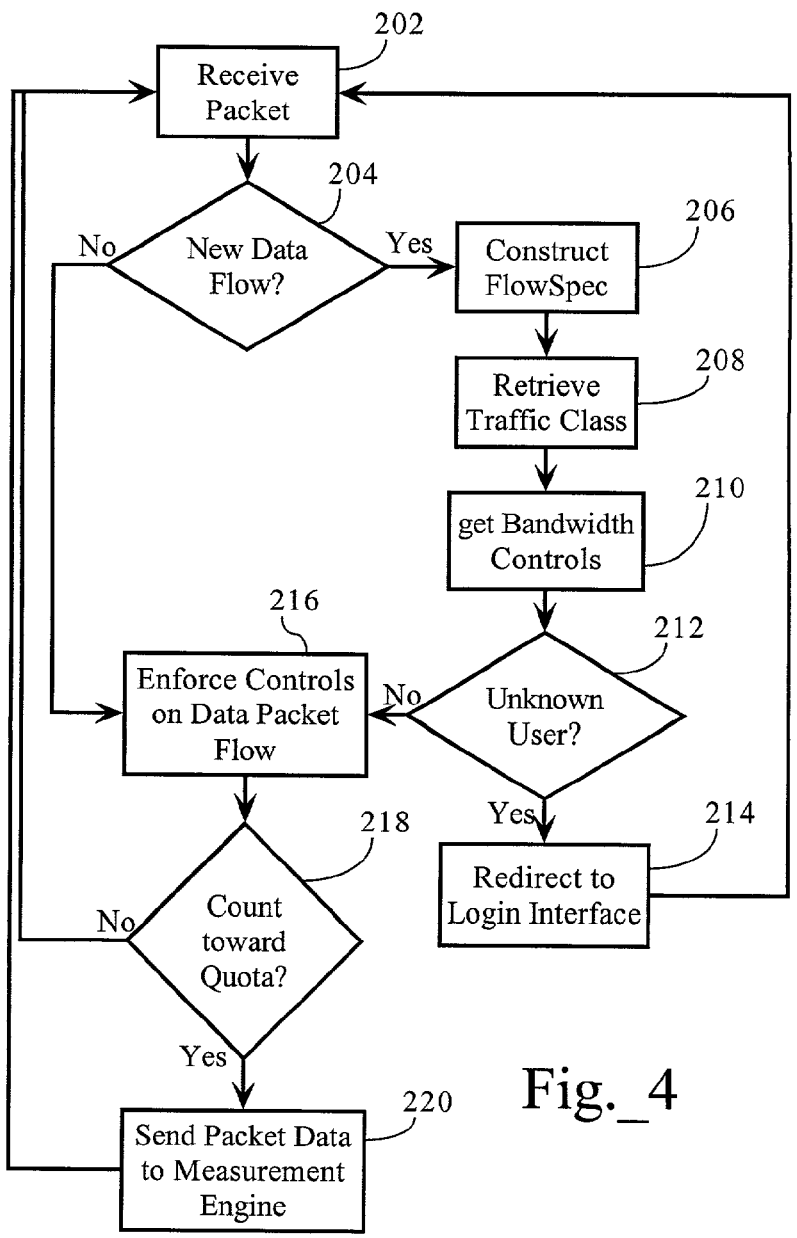
Fig._4

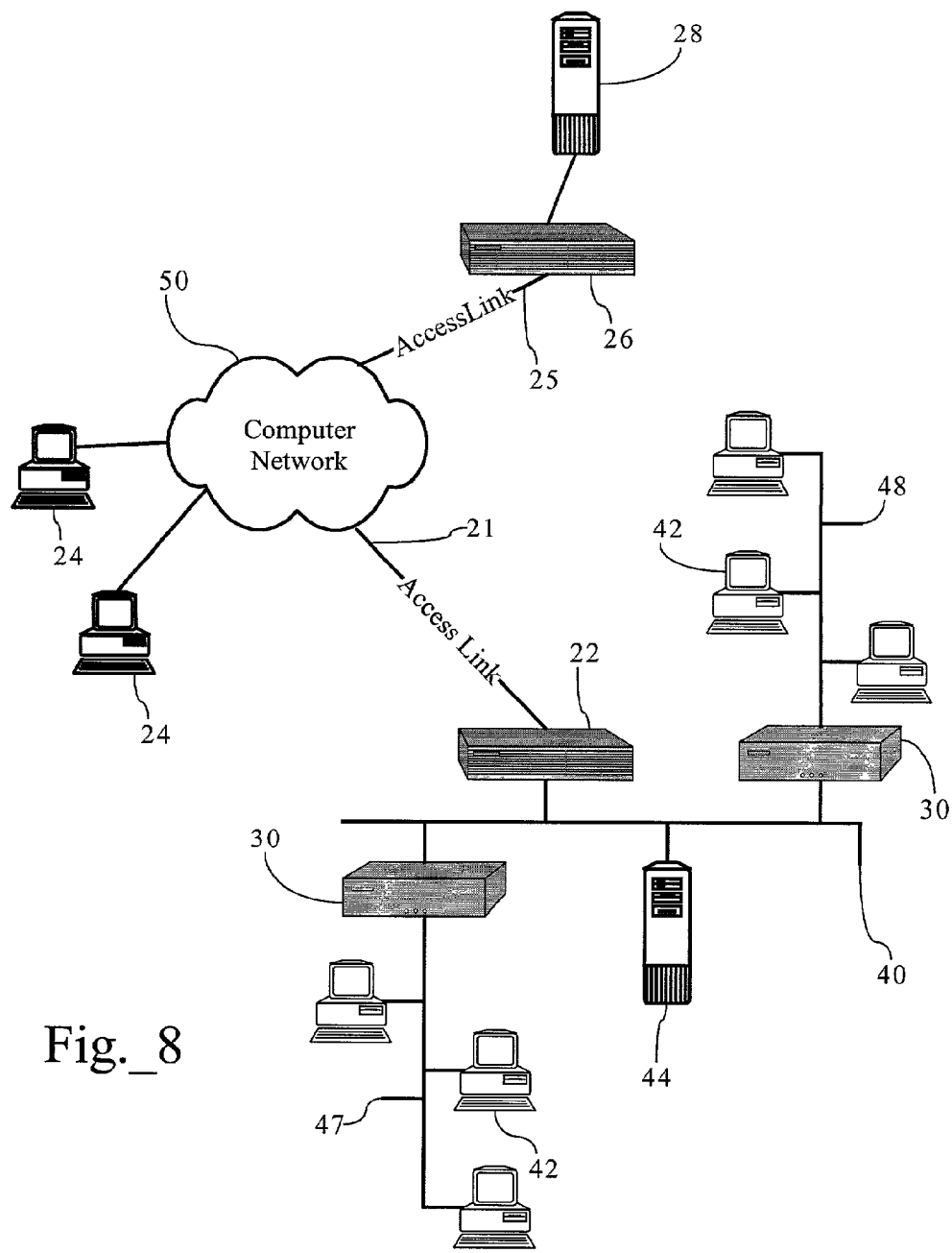
Fig._8

VOLUME-BASED NETWORK MANAGEMENT SCHEME

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/966,538, in the name of Guy Riddle, entitled "Dynamic Partitioning of Network Resources;" (which is now pending) and U.S. patent application Ser. No. 09/885,750, (which is now abandoned) in the name of Scott Hankins and Brett Galloway, entitled "System and Method For Dynamically Controlling a Rogue Application Through Incremental Bandwidth Restrictions."

FIELD OF THE INVENTION

The present invention relates to computer networks and, more particularly, to methods, apparatuses and systems allowing for deployment of volume-based network policies.

BACKGROUND OF THE INVENTION

Entities, such as colleges and universities, are growing increasingly dependent on computer network infrastructures to provide services and accomplish tasks. Indeed, a wide variety of administrative and educational tasks are now allocated to servers operably connected to a campus network. Moreover, Internet or other wide area computer network access is a standard and expected aspect of the services provided to students by colleges and universities. As the number of users, applications and external traffic increases, however, network congestion forms, impairing computer network performance. For example, peer-to-peer file sharing technologies, such as Napster, Morpheus, and the like, have unleashed a relative explosion of network utilization among college students creating myriad problems for network administrators and degrading the quality of service provided to other uses of the network. Network administrators, therefore, are constantly challenged with determining the volume, origin and nature of network traffic to align network resources with educational and administrative priorities and applications.

The widely-used TCP/IP protocol suite, which implements the world-wide data communications network environment called the Internet and is employed in many local area networks, intentionally omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite, where IP (Internet Protocol) is the Open Systems Interconnection (OSI) model network layer protocol and TCP (Transmission Control Protocol) is the OSI transport layer protocol. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a time slot within an allowable window which by its sliding operation essentially limits the amount of unacknowledged transmit data that a transmitter can emit. Another flow control mechanism is a congestion window, which is a refinement of the sliding window scheme involving a conservative expansion to make use of the full, allowable window. A component of this mechanism is sometimes referred to as "slow start."

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, routers can only control outbound traffic. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a plurality of users. For example, U.S. Pat. No. 6,038,216 discloses a method for explicit data rate control in a packet-based network environment without data rate supervision. Bandwidth management devices allow for explicit data rate control for flows associated with a particular traffic classification. Bandwidth management devices allow network administrators to specify policies operative to control and/or prioritize the bandwidth allocated to individual data flows according to traffic classifications. In addition, certain bandwidth management devices allow network administrators to divide available bandwidth into partitions to ensure a minimum bandwidth and/or cap bandwidth as to a particular class of traffic or individual user.

To avoid the costs and degradation in network performance caused by a disproportionate number of data flows generated by a small number of users, network administrators are essentially tasked with policing the network; that is, network administrators must manually identify users with unacceptably large network utilizations and configure network policies to limit the network traffic generated by them or cut them off completely. Recognizing the importance of network access to students, however, network administrators are hesitant to deny network access and often restore access after a period of time. Even with data flow rate control mechanisms, however, computer networks have no effective mechanism to limit the volume of traffic generated by users on an individual basis. Unlike the large telecommunications networks that have substantial infrastructure dedicated to tracking utilization on an individual basis, packet-based computer network environments do not typically include such functionality, let alone functionality to limit the volume of network traffic generated by individual users. In addition, while some web hosting enterprises include technologies that track and limit monthly data transfer associated with a hosted site, such technologies are not adapted to meet the needs of controlling or enforcing volume-based network policy to limit network utilization among a plurality of users. Accordingly, a need in the art exists for methods, apparatuses and systems allowing for deployment of volume-based network policy across a computer network. The present invention substantially fulfills this need.

SUMMARY OF THE INVENTION

The present invention provides methods, apparatuses and systems allowing for deployment of volume-based network policies across a computer network. In one embodiment, the present invention monitors network utilization of a plurality of users and detects the occurrence of network utilization milestones or other events for individual users, such as exceeding a data transfer allotment or threshold. To enforce the allotment or threshold, the present invention is operative to deny, degrade, or otherwise affect a characteristic associated with network access provided to such users.

DESCRIPTION OF THE DRAWINGS

FIG. 1 is a functional block diagram illustrating a computer network environment according to an embodiment of the present invention.

FIG. 2 is a functional block diagram illustrating functionality associated with a bandwidth management device according to an embodiment of the present invention.

FIG. 3 is a functional block diagram setting forth functionality associated with a user management server according to an embodiment of the present invention.

FIG. 4 is a flow chart setting forth a method for processing data flows according to an embodiment of the present invention.

FIG. 8 is a functional block diagram setting forth a computer network environment according to a second embodiment of the present invention.

DESCRIPTION OF PREFERRED EMBODIMENT(S)

Figure 5:
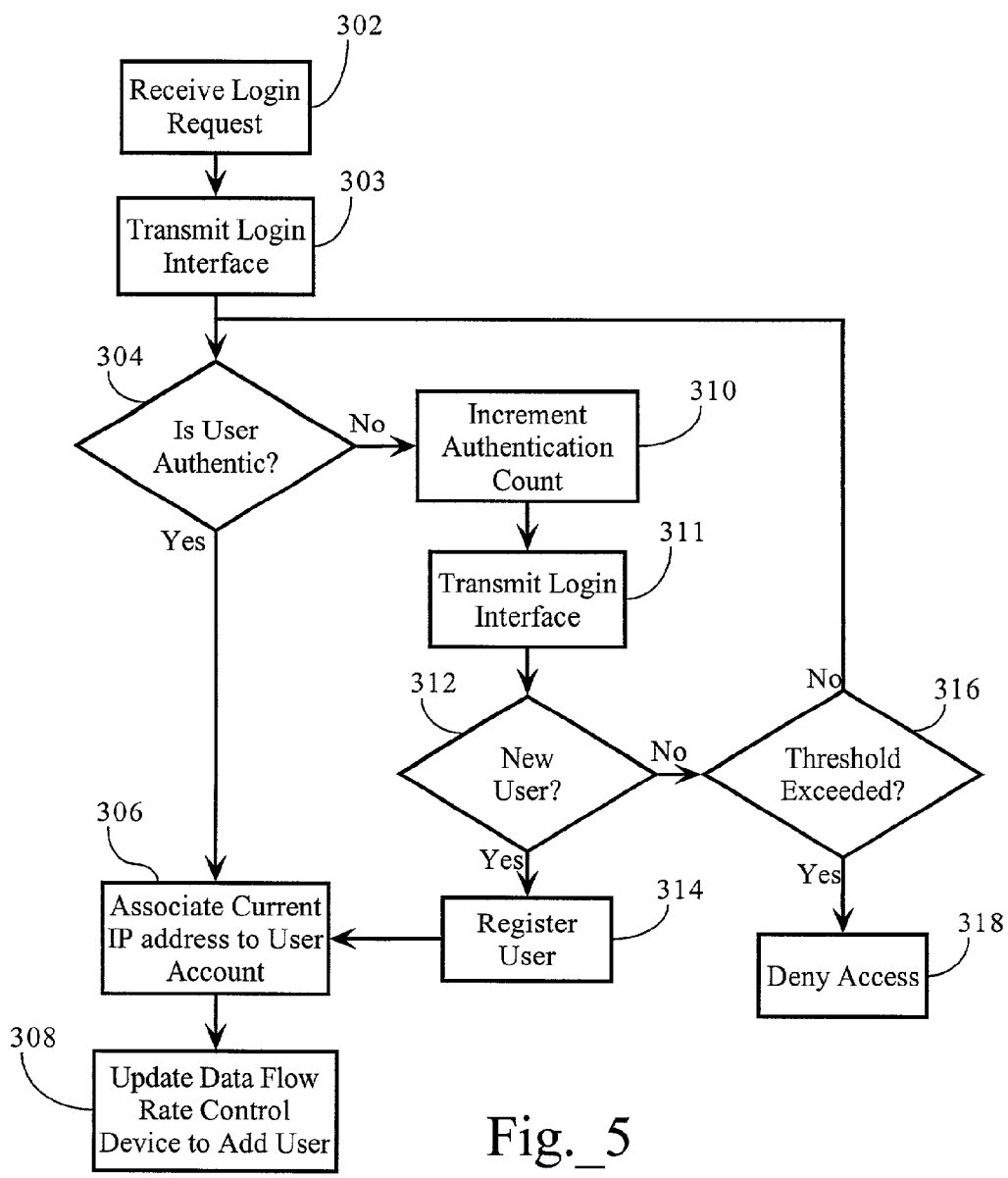
FIG. 5 is a flow chart providing a method facilitating user login and authentication according to an embodiment of the present invention.

FIG. 1 sets forth a packet-based computer network environment including bandwidth management device 30. As FIG. 1 shows, local area computer network 40 interconnects several TCP/IP end systems, including client devices 42 and user management server 44, and provides access to resources operably connected to computer network 50 via router 22 and access link 21. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols and has a plurality of interconnected digital packet transmission stations. Bandwidth management device 30 is provided between router 22 and local area computer network 40. Bandwidth management device 30 is operative to classify data flows and, depending on the classification, enforce respective bandwidth utilization controls on the data flows to control and/or allocate bandwidth utilization across access link 21.

A. Bandwidth Management Device

FIG. 2 is a block diagram illustrating functionality associated with bandwidth management device 30. In one embodiment, bandwidth management device 30 comprises packet processor 130, measurement engine 140, host database 134, and flow database 135. In one embodiment, bandwidth management device 30 further comprises traffic class engine 136 and traffic classification database 137. Packet processor 130 is operative to process data flows and to enforce bandwidth management controls on data flows traversing bandwidth management device 30. Measurement engine 140 monitors operation of bandwidth management device 30 to allow for collection of data associated with bandwidth utilization across access link 21 on a source/destination host or end system level and, in one embodiment, a traffic type or classification level. Host database 134 stores IP addresses and corresponding data associated with data flows traversing bandwidth management device 30. Flow database 135 stores and maintains flow state information associated with data flows traversing bandwidth management device 30.

Traffic class engine 136 is operative to identify traffic classes associated with data flows, as discussed more fully below. In one embodiment, traffic class engine 136 is configured to automatically create traffic classes based on the data flows traversing bandwidth management device 30. Traffic classification database 137 stores traffic classes in association with pointers to matching rules or pointers to data structures defining such matching rules. In one embodiment, traffic classification database 137 further stores, in association with traffic classes, bandwidth utilization control parameters or pointers to data structures defining bandwidth utilization control parameters.

Administrator interface 150 facilitates the configuration of bandwidth management device 30 and allows access to report data detailing the operation of device 30 including utilization of bandwidth across access link 21 on a traffic class and/or IP address level. Administrator interface 150 allows administrators, either directly or via user management server 44, to configure bandwidth management parameters, such as policies and partitions, to be applied to data flows. As discussed below, administrator interface 150 also allows user management server 44 to change the configuration of bandwidth management device 30 to add new users or modify the network access parameters associated with existing users. Administrator interface 150 can include a command line interface or a HTTP interface accessible, for example, through a conventional browser on client device 42.

A.1. Processing of Packets and Management of Flow and Host Databases

As discussed above, packet processor 130 is operative to monitor and process data flows traversing bandwidth management device 30. Packet processor 130, in one embodiment, is operative to identify new data flows and create flow specification objects including attributes characterizing such data flows. In one embodiment, packet processor 130 examines data packets traversing bandwidth management device 30 for new data flows. In embodiments involving TCP/IP protocols, packet processor 130 identifies new data flows with reference to SYN and/or SYN/ACK packets. In one embodiment, when packet processor 130 encounters a new data flow it stores the source and destination IP addresses contained in the packet headers in host database 134. Packet processor 130 further constructs a flow specification object including such attributes as pointers to the source and destination IP addresses in host database 134, as well as other flow specification parameters, such as service type, protocol type and other parameters characterizing the data flow. In one embodiment, such fields can include information gleaned from examination of data within layers 2 through 7 of the OSI reference model. U.S. Pat. No. 6,046,980, incorporated by reference herein, discloses classification of data flows for use in a packet-based communications environment. In one embodiment, packet processor 130 creates and stores a flow state record corresponding to the new data flow in flow database 135. In one embodiment, flow state record attributes include a pointer to a corresponding flow specification object, as well as other flow state parameters, such as TCP connection status.

Host database 134 stores IP addresses of host or TCP end systems (e.g., server 28, client device 24, client computer 42, etc.) associated with data flows traversing bandwidth management device 30. In one embodiment, host database 134 stores such computer network addresses in association with measurement data, such as the number of inbound bytes, the number of outbound bytes, and the last packet time. Measurement data includes data sampled by measurement engine 140 or data derived therefrom. In one embodiment, measurement data can include the number of packets sent to and/or from an IP address, the number of bytes, the number of flows associated with the IP address, and/or any other suitable usage data. In one embodiment, host database 134 is a recency database in that it stores only the IP addresses associated with the most recent data flows traversing bandwidth management device 30. In one embodiment, the oldest entries in host database 134 are deleted as needed for new entries.

Flow database 135 stores and maintains flow state information associated with data flows traversing bandwidth management device 30. In one embodiment, for each data flow, flow database 135 stores a flow state record including a pointer to a flow specification object (see above), as well as other flow state parameters, including TCP connection status. In one embodiment, flow database 135 releases flow state records upon termination of the corresponding data flow. In another embodiment, the oldest flow state record is deleted as needed in response to new data flows.

A.2. Enforcement of Bandwidth Management Parameters

As discussed above, packet processor 130 is also operative to enforce bandwidth utilization controls on data flows traversing bandwidth management device 30. Bandwidth utilization controls, in one embodiment, can be effected by the configuration of policies, partitions, or a combination thereof. Packet processor 130 can use any suitable functionality to enforce bandwidth utilization controls known in the art, including, but not limited to class-based weighted fair queuing, Committed Access Rate (CAR) and "leaky bucket" techniques. Packet processor 130 may incorporate all or a subset of the functionality described in the cross-referenced U.S. patents set forth above for controlling the rate of data flows. For example, U.S. Pat. No. 6,038,216, incorporated by reference herein, discloses methods and systems allowing for explicit data rate control in a packet-based communications network.

A.2.a. Partitions

A partition operates to manage bandwidth utilization for aggregate data flows associated with a traffic class. A partition protects a network traffic class by guaranteeing a defined amount of bandwidth and/or limits a network traffic class by placing a cap on the amount of bandwidth a traffic class can consume. Partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions are arranged in a hierarchy—that is, partitions can contain partitions. For example, a parent partition can be divided into multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department.

In one embodiment, a partition is created by selecting a traffic class and configuring a partition for it. As discussed above, configurable static partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

A.2.b. Policies

Packet processor 130 is also operative to enforce policy-type bandwidth utilization controls on network traffic across access link 21. Whereas partitions allow for control of aggregate data flows associated with a traffic class, policies allow for control of individual data flows. In one embodiment, packet processor 130 supports different policy types, including, but not limited to, priority policies, rate policies, discard policies, and redirection policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. A rate policy can be configured to establish a minimum rate for each flow, allow for prioritized access to excess available bandwidth, and/or set limits on total bandwidth that the flow can consume. A discard policy causes packet processor 130 to discard or drop data packets or flows associated with a particular traffic class. A redirection policy is operative to redirect HTTP or other requests to another server or network resource associated with the policy. In addition, other policies may be operable to direct user requests to reduced-graphics/text-based versions of web sites.

A.3. Measurement Engine

Measurement engine 140 samples data associated with the operation of bandwidth management device 30 and data flows traversing the device, including data allowing for measurement of bandwidth utilization across access link 21 with respect to a plurality of bandwidth utilization statistics. For example, measurement engine 140 monitors the number and size of inbound and outbound packets traversing bandwidth management device 30 on a traffic class level, including the IP address level. Such data allows for the calculation over a given analysis interval of bandwidth utilization statistics, such as average rate (bps), peak rate (bps), total inbound and/or outbound bytes, and network efficiency (i.e., the number of packets/flows/bytes that are not retransmitted over the total number of packets/flows/bytes). In one embodiment, measurement engine 140 periodically recalculates bandwidth utilization statistics for each IP address and stores them in corresponding fields in host database 134. In one embodiment, such periodic sampling can occur every minute. As discussed below, this measurement data can then be analyzed over a desired time interval (e.g., by minute, quarter-hour, hour, half-day, day, etc.) to enable effective decision-making with respect to bandwidth utilization controls applied to individual users.

A.4. Traffic Classification

A traffic class is a logical grouping of data flows that share the same characteristic or set of characteristics—e.g., a specific application, protocol, IP address, MAC address, port, etc. In one embodiment, each traffic class has at least one matching rule defining the criteria used for identifying a specific traffic type. In one embodiment, bandwidth management device 30 includes functionality allowing for classification of network traffic based on information from layers 2 to 7 of the OSI reference model.

Traffic classification database 137 stores traffic classes associated with data flows that traverse access link 21. Traffic classification database 137 stores the traffic classes and corresponding data (e.g., matching rules, bandwidth management control parameters, etc.) related to each traffic class in a hierarchical tree. This tree is organized to show parent-child relationships—that is, a particular traffic class may have one or more subordinate child traffic classes with more specific characteristics (matching rules) than the parent class. In one embodiment, the root traffic classifications are "/inbound/" and "/outbound/" data flows. Any data flow not explicitly classified is classified as "/inbound/default/" or "/outbound/default/". In one embodiment, administrator interface 150 displays the traffic class tree and allows for selection of a traffic class and the configuration of bandwidth utilization controls for that traffic class (e.g., policies, partitions, etc.). Administrator interface 150 also allows an administrator to manually create a traffic class by specifying a set of matching rules and, as discussed below, also automatically creates traffic classes by monitoring network traffic across access link 21 and classifying data flows according to a set of criteria to create matching rules for each traffic type.

Traffic class engine 136, in one embodiment, monitors network traffic passing through access link 21 and applies matching rules to identify a traffic class associated with each data flow. In one embodiment, traffic discovery engine 136 creates traffic classes automatically in response to data flows traversing bandwidth management device 30 and stores such traffic classes in traffic classification database 137. Automatic traffic classification is disclosed in application Ser. No. 09/198,090, now U.S. Pat. No. 6,412,000, which is incorporated herein by reference. In one embodiment, traffic class engine 136 must detect a minimum number of data flows for a given traffic type within a predefined period before it creates a traffic class in traffic classification database 137. As discussed above, administrator interface 150 allows for configuration of bandwidth utilization controls for auto-discovered and other traffic classes.

In one embodiment, traffic classes are configured to identify and segregate users into appropriate groups or categories and, thus, facilitate enforcement of volume-based network management policies. As discussed in more detail below, traffic class engine 136 applies matching rules to data packets based on IP address (or other suitable computer network address) to identify a traffic class associated with a particular user. In one embodiment, bandwidth management device 30 is configured to include traffic classes for known users, unknown users, and quarantined users. For example, traffic classification database 137 may include the following traffic classes: 1)/inbound/knownusers/, 2)/inbound/quarantined/, 3)/inbound/unknownuser/, as well as similar traffic classes for outbound data flows (e.g., /outbound/knownusers/, etc.). The matching rules associated with the /knownusers/ and /quarantined/ traffic classes are IP addresses, or other identifications added by user management server 44 to the configuration of bandwidth management device 30, as users register or exceed bandwidth utilization thresholds. In one embodiment, traffic class engine 136 applies such matching rules to the source or destination address (depending on the direction of the data flow) contained in packet headers to identify users associated with data flows traversing bandwidth management device 30. In one embodiment, if no matching IP address is found in the matching rules associated with the /knownusers/ or /quarantined/ traffic classes, traffic class engine 136 maps the data flows associated with the IP address to the /unknownusers/ traffic class. Of course, users could be further subdivided into other groups, such as preferred users, standard users, etc.

To facilitate enforcement of volume-based network management schemes, each traffic class has associated therewith bandwidth utilization controls (e.g., partitions, policies, etc.) operative to control utilization of access link 21. Specifically and in one embodiment, bandwidth utilization controls can be used to erect consequences for exceeding a data transfer allotment or threshold. In one embodiment, bandwidth management controls are configured to block or degrade network access provided to "quarantined" users. A variety of configurations are possible. For example, a discard policy may be associated with the /outbound/quarantined/ traffic class to deny network access to users exceeding their respective network utilization allotments. Alternatively, quarantined outbound or inbound network traffic may be placed in a partition that limits aggregate bandwidth utilization of quarantined users to ensure appropriate bandwidth for non-quarantined users. In addition, a network administrator may associate a redirection policy to the /unknownusers/ traffic class that is operative to cause bandwidth management device 30 to redirect users to network management server for authentication and/or creation of a new user account.

In one embodiment, the /knownusers/ traffic class may be associated with a partition guaranteeing a minimum level of bandwidth. Furthermore, the /knownusers/ traffic class may include several child traffic classes including matching rules identifying various network traffic types, such as Napster or other peer-to-peer file sharing technologies, FTP traffic, HTTP traffic, etc. Such child traffic classes may have respective policies associated with them to prioritize data flows within the /knownusers/ partition. Various configurations are possible. In one embodiment, each user may be dynamically assigned a child user partition of the parent /knownusers/ partition. Dynamic partitioning is disclosed in the above identified U.S. application Ser. No. 09/966,538, incorporated by reference herein. Still further, to assist network administrators in discovering the types of traffic generated by users, traffic class engine 136 may be further operative to automatically identify traffic types corresponding to data flows associated with known users and create child traffic classifications of the /knownusers/ traffic class (see above). Such discovered traffic classes, in one embodiment, can be associated with an /inbound/knownusers/autodiscovered/ category.

B. User Management Server

User management server 44 provides a central point of administration and access to the data and functionality described herein. In one embodiment, user management server 44 is operative to register users and configure bandwidth management device 30 to permit traffic flows associated with registered users to traverse access link 21. In one embodiment, user management server 44 is operative to authenticate existing users and configure bandwidth management device 30 to allow network access. User management server 44 is also operative to collect network utilization data from bandwidth management device 30 to monitor network utilization of individual users and change the configuration of device 30 as various users reach certain network utilization milestones.

FIG. 3 sets forth functionality associated with user management server 44 according to an embodiment of the present invention. In one embodiment, user management server 44 includes, or interacts with, web server interface 180, data logging engine 182, network usage monitor 184, event module 186, user interface module 188, query interface 190, user account database 192, and DHCP server 194. Web server interface 180 is operative to establish HTTP or other suitable connections with other hosts or nodes on computer network 40. Data logging engine 182 is operative to retrieve network utilization data from bandwidth management device 30 and store the data in user account database 192. Network usage monitor 184 is operative to monitor network utilization of a plurality of users as reflected in data stored in user account database 192 and trigger operation of event module 186 upon detection of a network utilization milestone or other event associated with a user. Event module 186 is operative to perform an action or set of actions associated with a particular milestone or event type. User interface module 188 facilitates configuration of and/or access to user management server 44 and data and system settings associated therewith. Query interface 190 comprises collection of computer programs enabling other modules described herein to store, modify, and/or extract information in user account database 192. DHCP server 194 is operative to dynamically assign IP addresses to network access devices, such as client computers 42, accessing network 40.

User account database 192 stores user accounts including data allowing for monitoring of network utilization of individual users. In one embodiment, each user account record includes a user identification, an email address, a password, a computer network address associated with the user, and network utilization fields characterizing the network utilization of the user. For example, network utilization fields can include the number of inbound bytes generated by the user, and the number of outbound bytes generated by the user. Network utilization fields can further include the time of the last packet associated with the user was processed by bandwidth management device 30.

User account database 192 can be any form of database known in the art (for example, a relational database or flat-file database). User account database 192 may be stored on any suitable device ranging from personal computers (for small systems) to mainframes (for large systems). In addition, the functionality of user management server 44 may be implemented in hardware or software, or a combination of both. In one embodiment, user management server 44 is a programmable computer executing computer programs and functionality described herein. Still further, the modules and functionality described herein may be implemented by computer programs written in PERL, C, Java, or any other suitable programming language. In one embodiment user management server 44 comprises at least one processor, a data storage system, at least one input device, and at least one output device. In addition, user account database 192 described above may reside on user management server 44, or may reside on a physically separate database server. As FIG. 1 shows, user management server 44, in one embodiment, resides on a separate server; however, in other embodiments, all or a subset of the functionality associated with user management server 44 may reside on bandwidth management device 30.

User interface module 188 provides interfaces and associated functionality allowing users to interact with the system. For example, user interface module 188 allows users to register and establish users accounts, access data associated with existing users accounts stored in user account database 192, as well as change account settings and/or passwords. For example, existing users can access user management server 44 to track their usage versus a quota or an allotment. In one embodiment, user interface module 188 include functionality allowing for presentation of such usage data in graphs or charts. User interface module 188 is also operative to authenticate users. User interface module 188, in one embodiment, is further operative allow network administrators to configure operation of user management server 44 and bandwidth management device 30. For example, user interface module 188 allows network administrators to manually reset network utilization data associated with a user account or manually delete an IP address from the configuration of bandwidth management device 30.

B.1. Identification of Users

In one embodiment, users are identified relative to the IP address of client computer 42 or other network access device operably connected to computer network 40. In one embodiment, client computers are configured with a static IP address provided to the user during registration. In another embodiment, client computers 42 are configured as DHCP clients to request an IP address from DHCP server 194 on user management server 44 or other device associated with computer network 40. In one embodiment, DHCP server 194 reserves IP addresses for particular client computers or other devices. In one embodiment, DHCP server 194 stores the reserved IP addresses in association with corresponding device identifications (e.g., MAC address) or any other suitable link layer address. In another embodiment, reserved DHCP addresses are reserved based on client login identification, such as Windows-based login identifications. In an alternative embodiment, the system is configured to require users to login upon initialization of the network access device to allow for an association of an IP address to a particular user. Beyond computer network addresses, users may also be identified by any other suitable means, including RADIUS, Kerberos, ActiveDirectory, etc.

FIG. 5 illustrates a method providing for registration and authentication of users. When user management server 44 receives a login request from a client device 42 (step 302), it transmits a login interface in response (step 303). In one embodiment, the login interface requires the user to enter a user name and password for authentication purposes. If the user is authenticated (step 304), user management server 44 associates the IP address of the client computer 42 corresponding to the user with the user's account in user account database 192 to enable tracking of the user's network utilization (306). In addition, to allow network access, user management server 44 updates the configuration of bandwidth management device 30 to add the user's IP address to the matching rules associated with the traffic classes corresponding to known users (step 308). If the user is not authenticated, user management server 44 increments an authentication count associated with the IP address in a temporary buffer (step 310). User management server 44 then transmits a page-based interface indicating that no user account was found and inviting the user to establish a new user account or re-enter existing user account information (step 311). According to one embodiment, the user is allowed a maximum number of attempts to login using an existing user account before access is denied (see steps 316 and 318). If the user is a new user (step 312), user management server 44 registers the new user (step 314). After registration of the user, user management server associates the current IP address to the user's account (step 306) and updates the configuration of bandwidth management device 30 to permit network access to the user (step 308).

B.2. Monitoring Network Usage

As discussed above, data logging module 182 is operative to collect network utilization data maintained by bandwidth management device 30. On a periodic basis (e.g., every 15 minutes, every hour, etc.), data logging module 182 accesses data flow control module 30 via administrator interface 150 to download the network utilization data (inbound and outbound bytes) associated with the IP addresses stored in host database 134. In one embodiment, bandwidth management device 30 resets the network utilization values for each IP address in host database 134 after it successfully responds to a request for network utilization data from user management server 44. Data logging module 182 then accesses user account database 192, via query interface 190, to log network utilization data in appropriate user accounts. In one embodiment, data logging module 182 identifies the user accounts associated with the IP addresses in the network utilization data and updates corresponding network utilization fields as required. For example and in one embodiment, data logging module 182 updates the number of inbound and outbound bytes generated by a user, as well as the last packet time associated with the user.

Network usage monitor 184 is operative to monitor network utilization of a plurality of users and to detect a milestone or other network utilization event. In one embodiment, network usage monitor 184, on a periodic basis, scans user account database 192 to detect whether a network utilization value associated with an account has exceeded a threshold utilization level.

Figure 6:
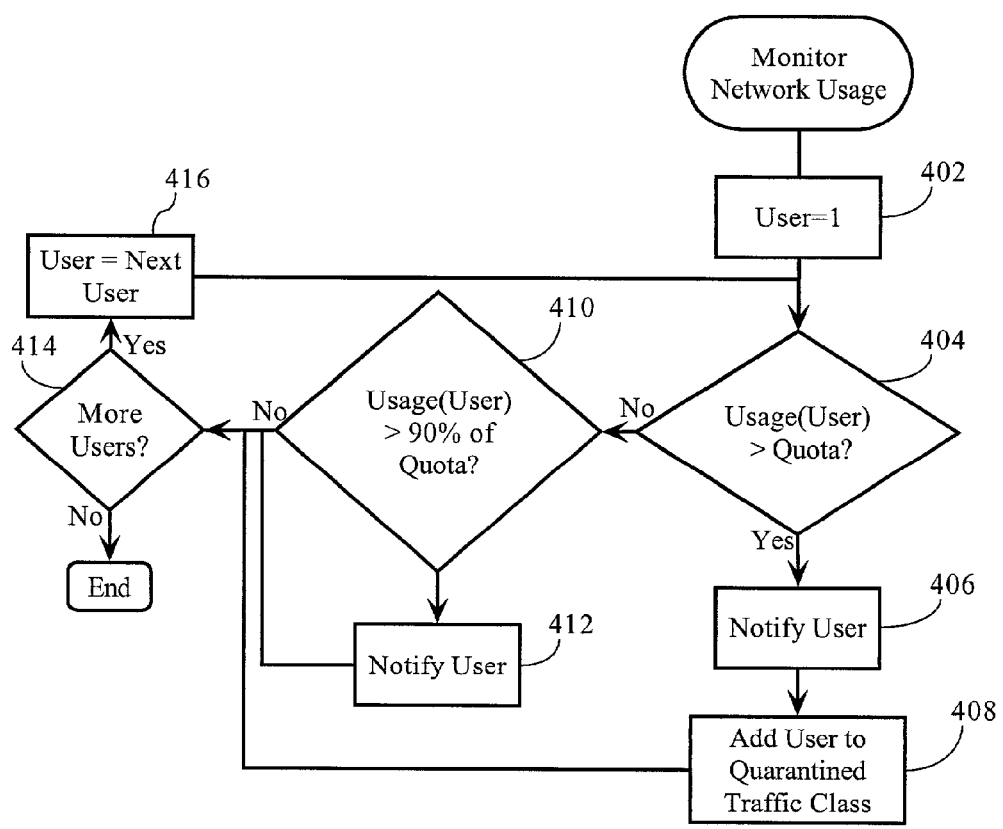
FIG. 6 is a flow chart diagram illustrating a method directed to monitoring network usage associated with a plurality of users, according to an embodiment of the present invention.

FIG. 6 illustrates a method allowing for detection of network utilization milestones (such as when users have exceeded their network utilization allotment). As discussed above, network usage monitor 184, in one embodiment, scans user account database 192 to determine whether users have exceeded their respective network utilization allotments. Starting with the first user account (step 402), network usage monitor 184 determines whether the network utilization value associated with the account exceeds a utilization threshold (step 404). In one embodiment, the utilization threshold is uniform across all users; in another embodiment, network utilization allotments can be individually configured by associating a separate utilization threshold value to each user account. If the utilization threshold is exceeded, network usage monitor 184 triggers event module 186 to perform a predefined set of actions in response. In one embodiment, event module 186 accesses user account database 192 to retrieve the email address associated with the user account to notify the user via email that his or her network utilization quota has been exceeded (step 406). Event module 186, according to one embodiment, accesses bandwidth management device 30 to add the user to the "quarantined" group (step 408). In one embodiment, event module 186 configures bandwidth management device 30 to add the IP address associated with the user to the matching rules defining the /inbound/quarantined/ and /outbound/quarantined/ traffic classes.

As FIG. 6 shows, network usage monitor 184, in one embodiment, is further operative to warn users that they are nearing their respective network utilization allotments. In one embodiment, if the user's network utilization is over 90 percent of the allotted network utilization (step 410), network usage monitor 184 triggers event module to notify the user that he or she has used 90 percent of his or her data transfer allotment (step 412).

Figure 7:
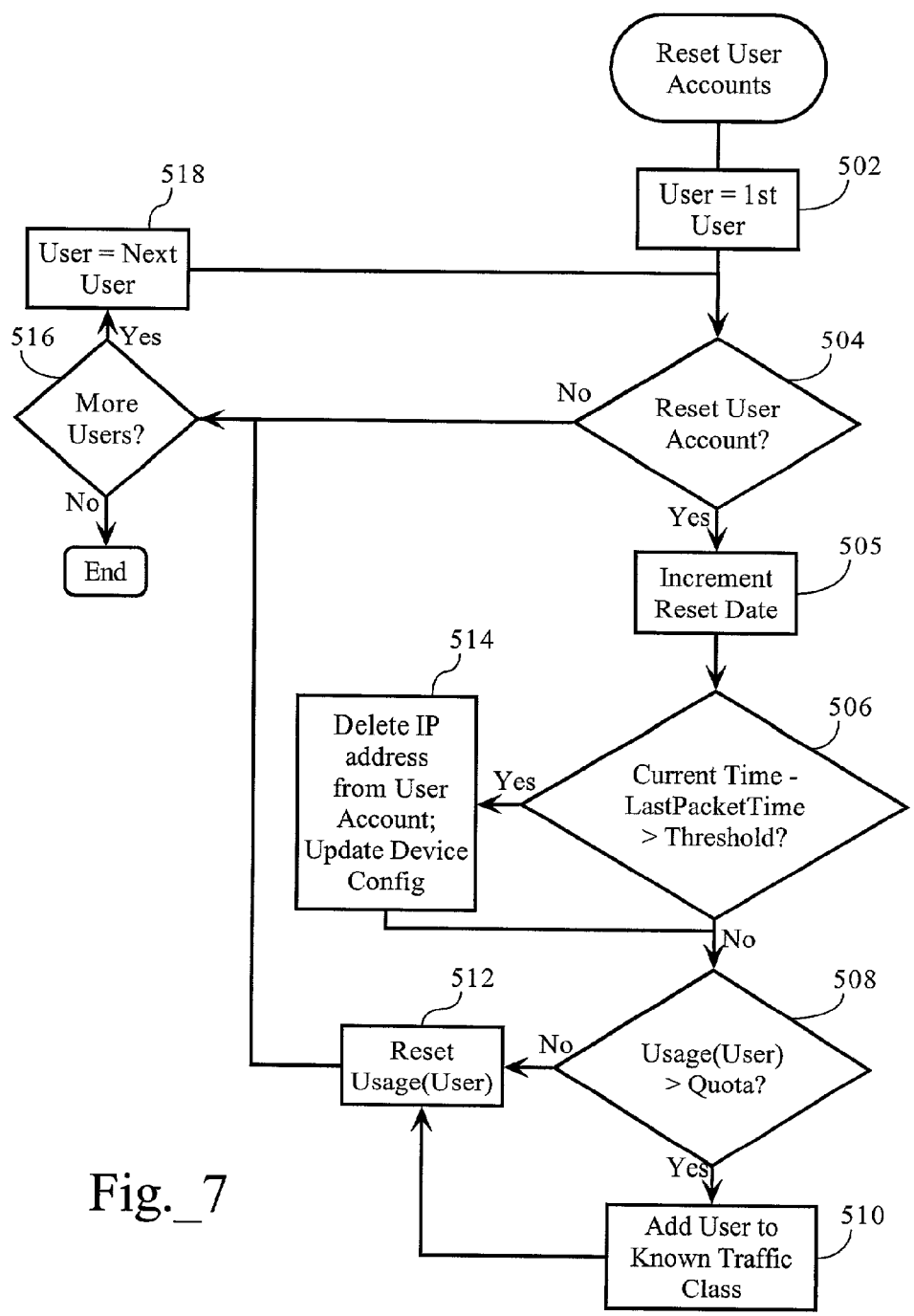
FIG. 7 is a flow chart diagram setting forth a method directed to resetting user accounts on a periodic basis.

The monitoring process described above can be performed on a periodic basis or continuously depending on desired behaviors of the system. In addition, the aggregate network utilization can be periodically reset to enforce a volume-based network policy scheme establishing, for example, a monthly or weekly network utilization allotment for each user. FIG. 7 sets forth a method associated with managing user accounts and resetting network utilization values. In one embodiment, network usage monitor 184 triggers event module 186 to reset user accounts as described below. Starting with the first user account in user account database 192 (see step 502), event module 186, in one embodiment, determines whether the user account should be reset (step 504). In one embodiment, each user account includes a reset date field indicating the date the user account should be reset. If the current date is later than or equal to the reset date, event module 186 increments the reset date by a reset interval (e.g., month, week, etc.) (step 505) and determines the actions necessary to reset the user account. In one embodiment, event module 186 determines whether the time of the last packet is beyond a threshold (step 506) and, if so, deletes the IP address from the user account and updates the configuration of bandwidth management device 30 to remove the IP address (step 514). This configuration frees up IP addresses associated with inactive users for new user accounts. Consequently, the user must authenticate with user management server 44 when attempting to access the network.

Event module 186 then resets the network utilization value associated with the user account (step 512). In one embodiment, if the user's network utilization for the period exceeded the quota (step 508) and was therefore a "quarantined" user, event module 186 updates the configuration of bandwidth management device 30 to add the IP address associated with the user to the /knownusers/ traffic classes (inbound and outbound) (step 510). Event module 186 then repeats this process for other user accounts in user account database 192 (see steps 516 and 518).

Event module 186, as discussed above, is operative to perform actions associated with network utilization milestones or other events. Event module 186, in one embodiment, include various scripts to perform such actions as transmitting email notifications, changing the configuration of bandwidth management device 30, and resetting user accounts. Event module 186 can perform various other actions associated with user accounts. For example, at the end of a reset interval, event module 186 can send network utilization data to a billing system to calculate charges for the user. In one embodiment, the user is charged for aggregate data transfer over his or her allotment. Network usage monitor 184 may also trigger event module 186 to transmit a monthly summary of network utilization to the user as an HTML-based email or an attachment thereto. Alternately, scheduled or ad-hoc reports could be generated and presented via a web page documenting a user's usage of bandwidth so he can track usage patterns versus quota and current status, as well as inform the user when access will be restored if he has been quarantined.

C. Operation

C.1. Enforcement of Volume-Based Network Policies

FIG. 4 illustrates a method facilitating the enforcement of volume-based network policy. In one embodiment, packet processor 130 receives a data packet (FIG. 4, step 202) and determines whether it is part of a new data flow (step 204). Methods for determining new data flows and assigning packets to existing data flows are well known in the art and also depend on the particular transport layer protocol employed. For a TCP packet, packet processor 130 determines a new data flow by detecting SYN and/or SYN/ACK packets. In other embodiments, packet processor 130 may have to encounter multiple packets to identify and fully characterize a new data flow (e.g., identify a traffic class, etc.). For example, U.S. Pat. No. 6,046,980 issued to Packer, identified above, discloses methods for classifying packet network flows.

If the packet is a new data flow, packet processor 130 creates a flow state record for the new data flow in flow database 135 (step 206). In one embodiment, packet processor 130 analyzes the source and destination IP addresses in the packet header and scans host database 134 for matching entries. If no matching entries exist, packet processor 130 creates new entries for the source and destination IP addresses. As discussed above, packet processor 130 constructs a flow specification object including attributes characterizing the data flow, including pointers to the source and destination IP address entries in host database 134. In one embodiment, a flow specification object characterizes the source and destination addresses as "inside" and "outside" addresses relative to bandwidth management device 30. See FIG. 1. For a TCP packet, packet processor 130 can compute the inside and outside addresses based on the source and destination addresses of the packet and the direction of the packet flow. Other flow specification attributes can include port number, service type, protocol, etc. In addition, if the packet represents a change to the data flow, packet processor 130 changes attributes of the flow state record and/or flow specification object as appropriate.

Packet processor 130 then invokes traffic class engine 136, passing a pointer to the flow specification object and/or record, to determine the traffic class associated with the data flow (step 208) (see Section A.4., above). As discussed above, traffic class engine 136 applies matching rules to the flow specification object to determine whether the "inside" IP address matches an IP address associated with known or quarantined users. If no matching IP address is found, traffic class engine returns the /unknownusers/ traffic class. In one embodiment, traffic class engine 136 modifies the flow state record in flow database 135 to include a pointer to the appropriate traffic class in traffic classification database 137.

Packet processor 130 then retrieves the bandwidth utilization controls associated with the traffic class (step 210). In one embodiment, the bandwidth utilization controls associated with the /unknownusers/ traffic class is a redirection policy operative to redirect the user to a page-based login interface presented by user management server 44. Accordingly, if the inside user IP address corresponds to an unknown user (step 212), packet processor 130 redirects the user to a Login interface (step 214) (see Section B.1., above) for authentication or registration. Otherwise, packet processor 130 enforces the bandwidth utilization controls associated with the traffic class on the data packet flow (step 216).

Packet processor 130, in one embodiment, determines whether the data flow should count towards the user's allotment (see step 218). In one embodiment, traffic type may determine whether a particular data flow may count towards a quota. As discussed above, additional traffic types can be classified as child traffic classes of the /knownusers/ traffic classes. For example, a college-run network may effect a policy that network traffic caused by interactions with administrative servers or other applications does not count toward each user's allotment. In addition, network administrators may opt to exclude retransmitted network traffic to avoid penalizing users for inefficient network performance. Of course, a variety of configurations are possible.

If the data flow counts toward the user's network utilization allotment, packet processor 130 sends a pointer to the flow specification object and/or packet to measurement engine 140 (step 220). In one embodiment, the flow specification object or a copy of it is stored in association with the packet and in the same buffer structure to facilitate access to attributes of the flow specification object by measurement engine 140. In one embodiment, measurement engine 140 determines the number of bytes in the packet and increments a byte count field associated with the inside IP address in host database 134. In one embodiment, measurement engine 140 also records the time of the last packet corresponding to the IP address in host database 134. As discussed above, data logging engine 182 collects such network utilization data (e.g., number of bytes, last packet time, etc.) from bandwidth management device 30 on a periodic basis and updates user account database 192 accordingly (see Section B.2., above).

C.2. Network Utilization Milestones and Affecting Network Access

The present invention allows for a variety of volume-based network policy and management schemes. For example, user management server 44 can be configured to establish a monthly or weekly network utilization quota for each user and terminate network access when this network utilization quota has been reached. As discussed above, this scheme can be effected, in one embodiment, by associating a discard policy to a /quarantined/ traffic class and adding the IP addresses associated with such users to the matching rules defining that traffic class. In addition, volume-based network policy schemes can include several milestones, each associated with a different consequence for the user's network access, where each consequence maps to a traffic class and associated bandwidth controls to effect the consequence. Moreover, traffic classes can be configured such that consequences for each user only apply to certain traffic types.

In addition, bandwidth utilization can be analyzed based on successive time intervals or a sliding window. For example, user management server 44 may be configured to log and aggregate bandwidth utilization on an hourly or daily basis and assess milestones for bandwidth utilization associated with respective users based on the last week, two weeks, month, etc. In one embodiment, user management server 44 drops bandwidth utilization data that is beyond the sliding analysis window.

In one embodiment, a network administrator may opt to degrade a performance characteristic associated with network access for users who have exceeded a network utilization quota. For example, the bandwidth controls associated with the /quarantined/ traffic class may include a partition that caps bandwidth utilization. Accordingly, as users exceed their quotas, data flows associated with them are placed in the quarantined users partition to compete for bandwidth allotted to the partition with other quarantined users. In one embodiment, data flows associated with quarantined users can be accorded a low priority relative to other data flows by associating a low priority bandwidth policy to the quarantined users traffic class.

Still further, the user's network access may be affected by charging the user for bandwidth utilization after a threshold utilization amount. In one embodiment, when network usage monitor 184 detects that a user has exceeded his allotment, it triggers event module 186 to transmit an email notifying the user that any further network utilization will be charged to the user. In addition, the present invention can be employed to create a tiered-rate billing structure based on the volume of traffic generated by the user. Still further, the present invention can be employed to create a pre-paid service where users pay for a set amount of data transfer. In one such embodiment, event module 186 can transmit emails notifying users that they are running out of pre-paid data transfer allotment and inviting them to purchase additional data transfer.

Still further, characteristics associated with network access may be sequentially affected as users surpass associated milestones. For example, user management server 44 may be configured to 1) notify a user after surpassing a first milestone, 2) degrade network performance after a second milestone, and 3) charge the user after surpassing a third milestone.

The present application also has application to a variety of settings. A college or university, for example, may erect a scheme that, after a student exhausts a data transfer allotment, restricts network traffic associated with entertainment, such as Napster, and data flows including MP3, WAV, and other formats. For example, the /outbound/quarantined/ and /inbound/quarantined/ traffic classes may each include an "entertainment" child traffic class, with appropriate matching rules, that includes a discard policy operative to deny network access to such traffic types. A business enterprise, for example, may use the present invention to provide employees a weekly allotment of non-business related data transfer. Furthermore, an Internet Service Provider may use the present invention to automatically identify heavy users and degrade the performance of network access provided to them if they exceed a data transfer threshold. In one embodiment, an ISP may employ the invention to degrade network performance on a per-session basis. For example, an ISP may track the volume of network traffic generated by users and reduce available bandwidth to users who have exceeded a data transfer threshold within a given time interval, such as one hour. Furthermore, after two hours of sustained network traffic attributable to a user, an ISP may further degrade network access, and so on, until the ISP ultimately denies further network access until after a 24-hour period.

D. Alternative Embodiments

The present invention permits a wide variety of configurations and implementations. Embodiments of the present invention can take advantage of existing data flow and rate control functionality supported by routers (e.g., CISCO® 7200 Series router), such as Committed Access Rate (CAR) and Class-Based Weighted Fair Queuing (CBWFQ). For example, bandwidth management device 30, or a router configured accordingly, identifies new users and redirects data flows traversing it to user management server 44 as described above to register new users. User management server 44 can then modify the policy configuration of a router to allow data flows associated with the user. User management server 44, in one embodiment, accesses the administrative interface of router 22 to modify policy configuration. To take advantage of CAR functionality, for instance, bandwidth management device 30 configures access control lists for "known" and "quarantined" users and associated rate policies according to the bandwidth controls associated with each user type. Alternatively, to utilize CBWFQ partitioning functionality, bandwidth management device 30 or user management server 44 configures an access control list including the new user as a matching criterion for a class map and associates a rate policy according to bandwidth controls (e.g., bandwidth and queue limiting settings) corresponding to the user type. According to either embodiment, router 22 enforces the bandwidth controls implemented by CAR or CBWFQ on subsequent data flows. In one embodiment, when the user is inactive, user management server 44 modifies the policy configuration of router 22 to delete the access control list or the class map associated with the inactive user.

In addition, several technologies can be used to monitor data transfer per IP address. As discussed above, bandwidth management device 30 can monitor data transfers associated with individual IP addresses. In other embodiments, the functionality of router 22 is augmented to include such monitoring functionality. For example, router 22 can be augmented with traffic monitoring functionality, such as Cisco's Netflow or similar technologies, to monitor network traffic on an IP address level and transmit the data to user management server or other data collector. In addition, a separate DSU or Ethernet-connected unit with RMON probe capabilities can be deployed to gather network utilization data on an IP address level. In addition, user management server 44 could send aggregate bandwidth utilization data to a RADIUS server for tracking and accounting purposes, instead of user account database 192.

FIG. 8 illustrates a second packet-based computer network environment including two bandwidth management devices 30, each monitoring and controlling data flows from computer networks 47, 48. According to this embodiment, user management server 44 is configured with knowledge of both bandwidth management devices 30 and is operative to associate inside IP addresses with the appropriate bandwidth management device 30 and configure them accordingly. In one embodiment, the REDIRECT message transmitted by bandwidth management device 30 to unknown users includes a field identifying the device 30 (either in the URL corresponding to the login interface or as a hidden field). Accordingly, after authentication and/or registration of the user, user management server 44 updates the bandwidth management device 30 identified in the login request to include the new IP address in the matching rules of the appropriate traffic class.

Lastly, although the present invention has been described as operating in connection with end systems employing the TCP and IP protocols, the present invention has application in computer network environments employing any suitable transport layer and network layer protocols. Moreover, the present invention can be applied to wireline computer networks, wireless computer networks, or a combination of both. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating deployment of volume-based network policies across a computer network, the method comprising:

monitoring, over a given time interval, an aggregate volume of data transfer corresponding to each user of a plurality of users, wherein the given time interval spans at least one week;

detecting, for a first user in the plurality of users, a network utilization milestone, wherein the network utilization milestone occurs when, within the given time interval, the aggregate volume of data transfer associated with the first user crosses a threshold, and wherein the detecting the network utilization milestone comprises comparing the aggregate number of transferred bytes associated with the first user over the given time interval against a threshold level defining the network utilization milestone; and allowing but degrading, only with respect to a predefined subset of traffic types, the network access provided to the first user identified in the detecting step.

2. The method of claim 1 further comprising:

charging the first user identified in the detecting step for further network access.

3. The method of claim 1 further comprising notifying the first user when the aggregate volume of data transfer associated with the first user approaches the threshold.

4. The method of claim 1 wherein the monitoring step is performed only with respect to a predefined set of traffic types.

5. The method of claim 1 wherein the given time interval spans one month.

6. A method facilitating deployment of volume-based network policies across a computer network, the method comprising:

monitoring, over a given time interval, an aggregate volume of data transfer corresponding to each user of a plurality of users, wherein the given time interval spans at least one week;

detecting, for a first user in the plurality of users, a network utilization milestone, wherein the network utilization milestone occurs when, within the given time interval, the aggregate volume of data transfer associated with the first user crosses a threshold, and wherein the detecting the network utilization milestone comprises comparing the aggregate number of transferred bytes associated with the first user over the given time interval against a threshold level defining the network utilization milestone; and denying further network access to the first user identified in the detecting step only with respect to a predefined subset of traffic types.

7. A method facilitating deployment of volume-based network policies across a computer network, the method comprising monitoring, over a given time interval, an aggregate volume of data transfer corresponding to each user of a plurality of users within a given time interval, wherein the aggregate volume of data transfer characterizes the volume of data corresponding to past and current data flows over the given time interval, and wherein the given time interval spans at least one week;

detecting, for a first user in the plurality of users, a network utilization milestone, wherein the network utilization milestone occurs when, within the given time interval, the aggregate volume of data transfer associated with the first user crosses a threshold, and wherein the detecting the network utilization milestone comprises comparing the aggregate number of transferred bytes associated with the first user over the given time interval against a threshold level defining the network utilization milestone; and, denying, for the remainder of the time interval, further network access only with respect to a predefined subset of traffic types to the first user identified in the detecting step.

8. The method of claim 7 further comprising:
degrading the network access provided to the first user identified in the detecting step.

9. The method of claim 7 further comprising:
charging the first user identified in the detecting step for further network access.

10. The method of claim 7 further comprising the step of notifying the first user when the aggregate volume of data transfer associated with the first user approaches the threshold.

11. The method of claim 7 wherein the time interval is a fixed time interval.

12. The method of claim 7 wherein the time interval is a sliding time interval.

13. The method of claim 7 wherein the monitoring step is performed only with respect to a predefined set of traffic types.

14. The method of claim 7 wherein the given time interval spans one month.

15. A method facilitating deployment of volume-based network policies across a computer network, the method comprising the steps of
registering a user at a network access device connected to a first computer network, the network access device including an IP address;
associating the IP address with the user;
providing the user access to a second computer network by changing the configuration of a network device in a communication path between the first computer network and the second computer network;
monitoring, over a given time interval, an aggregate volume of data transfer associated with the IP address, wherein the given time interval spans at least one week;
detecting a network utilization milestone based on the aggregate volume of data transfer within the given time interval associated with the IP address relative to a threshold, and wherein the detecting the network utilization milestone comprises comparing the aggregate number of transferred bytes associated with the first user over the given time interval against a threshold level defining the network utilization milestone;
changing the configuration of the network device to allow, but degrade access to the second network provided to the user only with respect to a predefined subset of traffic types.

16. The method of claim 15 wherein the given time interval spans one month.

17. An apparatus facilitating the deployment of volume-based network policies across a first computer network, the first computer network comprising at least one traffic monitoring device operative to monitor the volume of network traffic generated by individual users, and at least one network control device operative to control access to a second computer network, comprising
a user account database maintaining respective aggregate volumes of data transfer corresponding to each user of a plurality of users;
a data logging engine operative to collect the aggregate volume of data transfer within a given time interval for the plurality of users collected data in the user account database, wherein the given time interval spans at least one week;
a network usage monitor operative to:
scan the user account database to detect, for a first user in the plurality of users, a network utilization milestone reached by the first user based on the aggregate volume of data transfer associated with the first user in relation to a threshold and the given time interval by comparing the aggregate number of transferred bytes associated with the first user over the given time interval against a threshold level defining the network utilization milestone, and
modify the configuration of the network control device to allow access to the second computer network for the first user only as to a predefined subset of network traffic types.

18. The apparatus of claim 17 further comprising a user interface module operative to register new users and create corresponding user accounts in the user account database.

19. The apparatus of claim 17 wherein the given time interval spans one month.

20. The apparatus of claim 18 wherein the apparatus, in response to registration of a new user, is operative to modify the configuration of the network control device to allow access to the second computer network for the new user.

* * * * *